(12) United States Patent
Hanselmann

(10) Patent No.: US 6,366,164 B1
(45) Date of Patent: Apr. 2, 2002

(54) INTEGRATED CIRCUIT LAYOUT FOR LF - SIGNAL ACQUISITION IN THE CASE OF CONTACTLESS DATA TRANSMISSION

(75) Inventor: Dieter Hanselmann, Oehringen (DE)

(73) Assignee: Atmel Germany GmbH, Heilbronn (DE)

( * ) Notice: Subject to any disclaimer, the term of this patent is extended or adjusted under 35 U.S.C. 154(b) by 0 days.

(21) Appl. No.: 09/721,186

(22) Filed: Nov. 20, 2000

(51) Int. Cl.$^7$ .............................. H03D 1/00; H04B 1/16; H04B 1/18

(52) U.S. Cl. ....................... 329/358; 329/347; 329/362; 455/269; 455/291; 455/337

(58) Field of Search ........................ 329/347, 358–364, 329/369; 455/269, 280, 291, 337

(56) References Cited

U.S. PATENT DOCUMENTS 5,796,180 A * 8/1998 Glehr ........................ 307/10.5
5,835,010 A * 11/1998 Asakura et al. ............. 340/505

FOREIGN PATENT DOCUMENTS

EP 0745747 12/1996

OTHER PUBLICATIONS

Remote Control and Identification Systems Design Guide 1997; TEMIC Semiconductor, pp. 352 and 353.

* cited by examiner

*Primary Examiner*—David Mis
(74) *Attorney, Agent, or Firm*—W. F. Fasse; W. G. Fasse

(57) ABSTRACT

Integrated circuit layout for LF signal acquisition in the case of contactless data transmission Known circuit layouts for LF signal acquisition only provide for a very short communication distance between transponder and base unit, and consist of several ICs that need to be assembled.

Using bipolar or MOS circuit layouts where the LF signal acquisition for the AM demodulator is effected on at least one of the two H bridge circuit branches. This increases system sensitivity and thus the communication distance between transponder and base unit. Due to the reduced voltage strength requirements with regard to the AM demodulator, it will become easy to integrate this circuit component jointly with the H bridge into an IC.

8 Claims, 2 Drawing Sheets

INTEGRATED CIRCUIT LAYOUT FOR LF - SIGNAL ACQUISITION IN THE CASE OF CONTACTLESS DATA TRANSMISSION

BACKGROUND

1. Field of the Invention

The subject invention concerns an integrated circuit layout for LF—signal acquisition used to implement a contactless data transmission between a transponder and a base unit to acquire a low frequency signal which was modulated onto a carrier signal by means of AM modulation, and which comprises a serial oscillating circuit (L, C, R) that is excited by transistors (T1–T4), connected as an H bridge in the form of two circuit branches (T2, T3, and T1, T4), with both circuit branches (T2, T3, and T1, T4) of the H bridge being respectively driven by a single control circuit (S1, S2), and the H bridge being connected to a voltage supply source (VB), and a resistor (R1, R2) being respectively connected in series with a circuit branch (T2, T3, and T1, T4) of the H bridge.

2. Description of the Related Technology

Contactless identification systems consist of a transponder (data carrier) and a base station (write/read unit). The communication between transponder and base unit is effected by a high frequency field (carrier signal) transmitted by the base unit using a serial oscillating circuit. As the transponder does not have its own energy supply, the necessary energy must be taken from the high frequency field by means of a receiver coil. As soon as the energy taken up by the transponder is sufficient for reliable communication to be set up, the transponder will return—via the receiver coil—a low frequency data signal, which was modulated onto the received carrier signal by AM modulation, to the base unit. In the base unit, the signal induced in the transmission coil for regaining the low frequency data signal will be separated from the carrier signal by means of an AM demodulator, and then provided to a logic unit for further processing. As the inductive coupling between the transponder coils and the base unit is small due to the low permeability constant of air, the distance between transponder and base unit must generally not be more than just a few cm. In order to transmit sufficient energy from the base unit to the transponder through the high frequency field, the amplitude of the carrier signal on the serial oscillating circuit of the base unit must be in the region of 100V. This will cause the serial oscillating circuit to be excited with its natural frequency by means of the two circuit branches of a H bridge. Due to the low coupling, even the AM modulation gain which the transponder causes in the serial oscillating circuit of the base unit will be in the region of 1 volt only. In order to increase the range, as well as to provide for a safe transmission of data between transponder and base unit solutions must be sought that will increase system sensitivity. As this is a product sector with a very high volume of quantities, it is particularly important here that all system functions are integrated in a single circuit layout at low cost.

From the data book TEMIC Semiconductor 1997 p. 352 and p. 353, circuit layouts are known where the decoupling of the modulated carrier signal is effected between the coil and capacitor of the serial oscillating circuit. As both reference points of the serial oscillating circuit change over in between ground and supply potential in line with the frequency of the carrier, the carrier signal is overlaid by a further signal with the amplitude of the supply voltage (5V). In order to separate the data signal from the carrier, the modulated signal whose amplitude is approximately 100V will be provided to an external AM demodulator. Depending on the voltage strength of the AM demodulator, the modulated carrier signal must be adapted via an additional voltage divider. Following demodulation, the separated data signal will be provided to the control IC of the base unit for further processing.

In the case of this known solution, system sensitivity and thus the range for a safe transmission of data between transponder and base unit will be low, as the modulation gain is reduced by the voltage divider, and the carrier signal is overlaid with an interference signal which is as high as the operating voltage. In addition, with this type of decoupling, only one half (the positive amplitude) of the modulated carrier signal can be evaluated. Furthermore, due to the extreme voltage strength requirements leading to high costs, it is so far not possible to integrate the demodulator circuit into the integrated circuit (IC) of the control circuit layout.

SUMMARY OF THE INVENTION

It is the task of the invention described here to state a monolithically integratable circuit layout, which will—by means of an increased system sensitivity—increase the range at which a data exchange can be effected between transponder and base unit, and at the same time allow the AM demodulator circuit to be integrated into the exciter circuit at low cost.

According to the invention this task is solved by an integrated circuit layout for LF signal acquisition pursuant to the characteristics of patent claim 1. Favorable implementations are the subject of sub-claims.

Investigations conducted by the applicant have shown that the system sensitivity of the "transponder—base unit" arrangement will increase significantly, if the decoupling of the modulated carrier signal for LF signal acquisition by means of an AM demodulator is effected on both circuit branches of the base unit H bridge, which excite the serial oscillating circuit. As the voltage amplitude in both circuit branches of the H bridge can change over between ground potential and operating voltage only, there is no need for the voltage divider on the input of the AM demodulator, as an input voltage strength of the AM demodulator as high as the supply voltage will be sufficient. Excluding the transmitter coil of the base unit, it is thus possible to implement all circuit components in a single IC of a low blocking and highly integrative technology. In this way, the base unit can be built up with extreme compactness and at low cost. In addition, the circuit layout according to the invention also provides for implementations in bipolar as well as CMOS technologies.

BRIEF DESCRIPTION OF THE FIGURES

In the following, the invention will be illustrated and elucidated in accordance with the drawings as shown in FIGS. 1 to 4. The figures show.

DESCRIPTION OF THE PREFERRED EMBODIMENTS.

The above-mentioned figures show, respectively, only that part of the base unit to which the invention relates. FIG.

1 shows a first embodiment of the circuit layout in accordance with the invention, where an AM demodulator AM can also be integrated. Here, a serial oscillating circuit C, L and R is excited via two outputs A1, A2 by the two circuit branches T1, T4, and T3, T2 of a H bridge. The two circuit branches of the H bridge will be pulsed by a first control circuit S1, which is fed with an inverted square wave signal having the natural frequency (carrier frequency) of the oscillating circuit, and a second control circuit S2, which is fed with the non-inverted square wave signal having the carrier frequency of the oscillating circuit. Whilst the emitters of transistors T3, T4 are each connected to a positive supply potential VB, the emitters of the complementary transistors T1, T2—via the negative feedback resistors R1, R2, which a controllable current source Q1, Q2 is respectively connected to in parallel,—are applied to ground potential. Here, the current sources Q1, Q2 are controlled such by the AM demodulator AM such that they take up the largest part of the current Is1, Is2 flowing through the oscillating circuit. The remaining parts ΔI1, ΔI2, the quantity of which is preferably between 1% and 5% of the respective current (Is1, Is2), flow through the resistors R1, R2, and will, for each circuit branch T1, T4 or T3,T2, generate a voltage drop V1, V2. In order to regain the low frequency data signal, the two amplitude signals (V1,V2) are used as input signals for an AM demodulator AM also controlled with the frequency of the carrier signal. Thus the AM demodulator AM will receive a voltage peak corresponding to the modulation condition of the carrier signal at its inputs in respect of each single square wave signal. In relation to the voltage gain supplied by a non-modulated carrier signal, these voltage peaks are either lower or higher. In order to increase the system sensitivity, it is advantageous here to detect the voltage peaks from both circuit branches of the H bridge. In accordance with the quantity of the current flow in the respective circuit branches of the H bridge, the potential on the emitters of the transistors T1, T2 varies between ground and voltage supply VB, only reduced by the two saturation voltages (VCEsat) of each respective circuit branch T1, T4 or T3,T2. The lower voltage strength requirement in respect of the AM demodulator AM allows this AM demodulator to be integrated in an IC jointly with the control circuit for the serial oscillating circuit. There is thus no longer any need for a cost-intensive assembly of various components on a single printed circuit board. Moreover, the circuit layout according to the invention also allows a PIN on the IC to be saved, as the modulation signal need no longer be provided externally.

Figure 1:
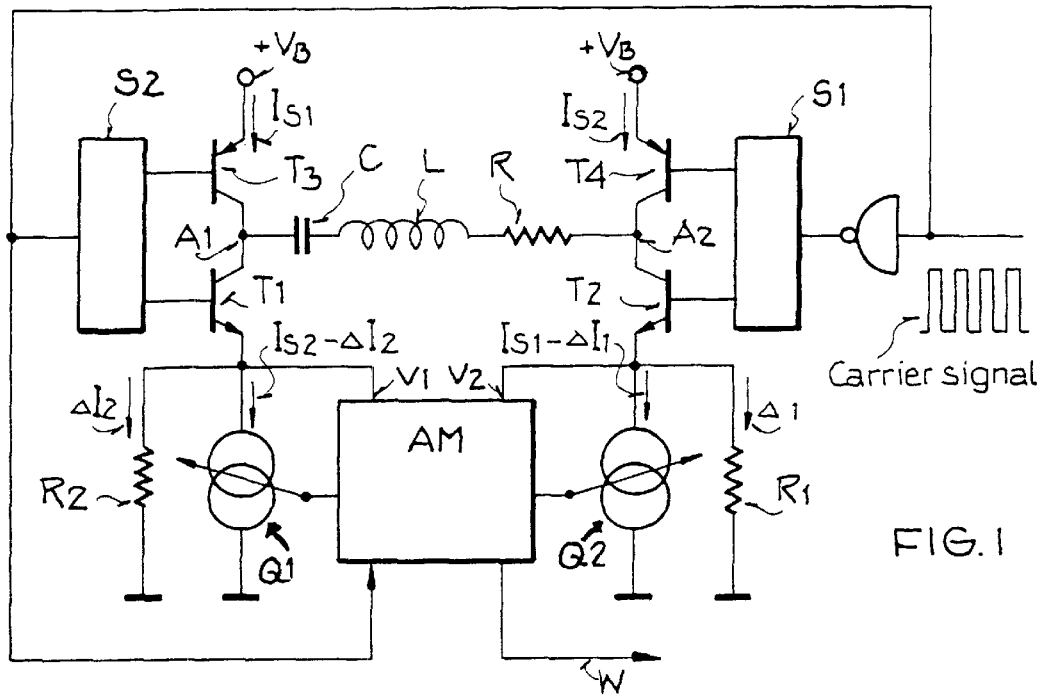
FIG. 1 A first embodiment of the invention as a circuit layout with bipolar-transistors, FIG. 2 a further embodiment of the invention where MOS transistors are used, FIG. 3 a further circuit layout according to the invention where the signal decoupling is effected directly on the inputs of the serial oscillating circuit, and, FIG. 4 a final embodiment of the invention based on the circuit layout according to FIG. 3.
Figure 2:
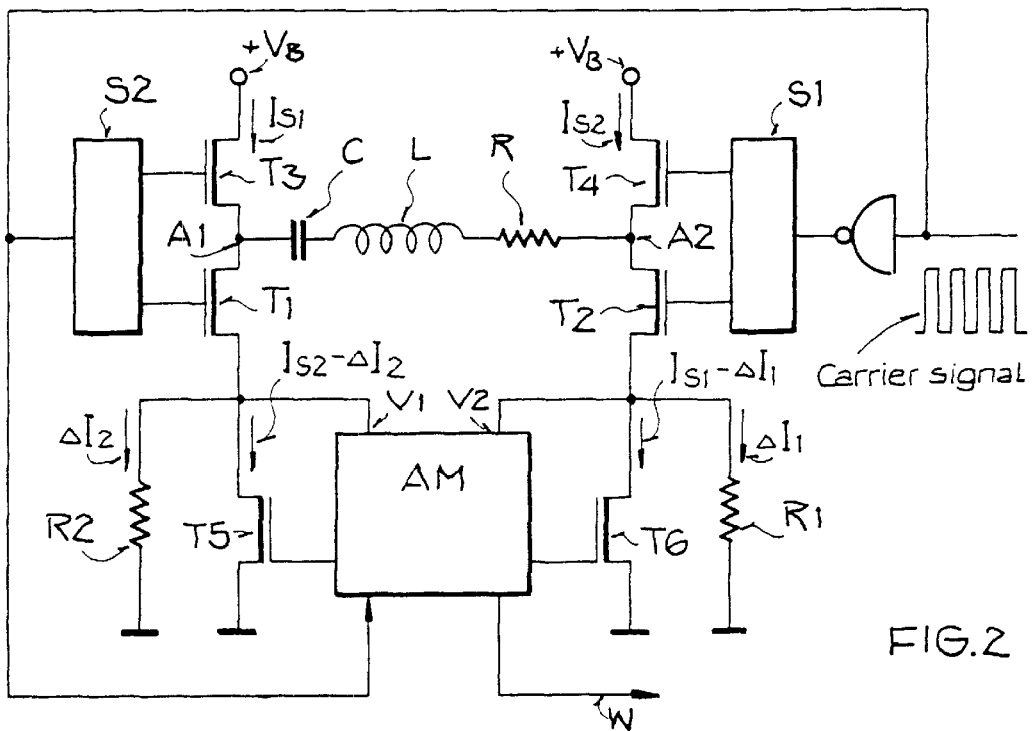

FIG. 2 shows a further advantageous embodiment of the circuit layout according to the invention. Here, within both H bridge circuit branches, the bipolar transistors are replaced by the MOS transistors T1 to T4. As, with MOS transistors, the voltage drop in the gated condition is lower than the saturation voltage (VCEsat) of a bipolar transistor, the modulation gain of the carrier signal and the system sensitivity will thus be increased. At the same time the dissipation in the H bridge circuit branches will reduce. Furthermore, in both circuit branches the controllable current sources Q1, Q2 can be replaced by MOS transistors T5, T6, thus providing for an additional simplification of the circuit layout. Here, these transistors T5, T6 need to be dimensioned such that these will accept in their gated condition the largest part Is1–ΔI1, or Is1–ΔI2, of the current Is1, Is2 flowing through the oscillating circuit. Preferably, the proportion of the current Is1–ΔI1, Is2–ΔI2 will be in the range between 95% and 99% relative to the currents Is1, Is2 flowing through the respective circuit branches. Accordingly, the quantity of the currents ΔI1, ΔI2 flowing through the resistors R1, R2 will be in the range between 5% and 1% of the currents Is1, Is2.

Figure 3:
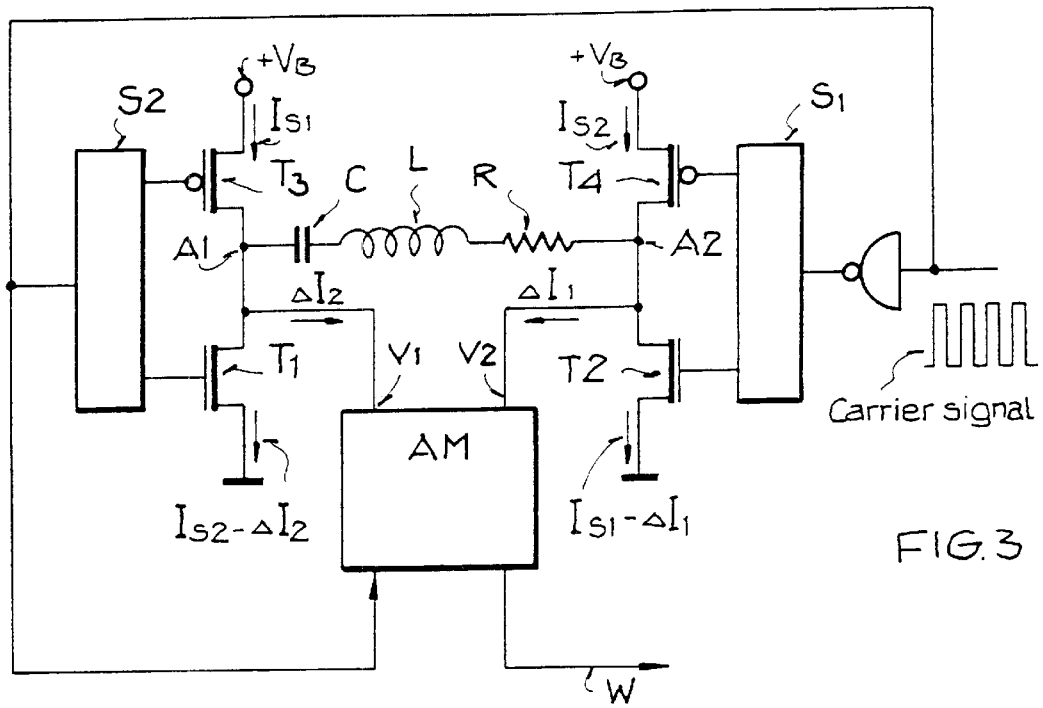

FIG. 3 shows a further advantageous embodiment of the circuit layout according to the invention. By tapping the modulation signal on both outputs A1, A2 of the two H bridge circuit branches, it becomes possible to do without both negative feedback resistors R1, R2 and without the controllable current sources Q1, Q2. The prerequisite condition is that the dimensioning ratio of the transistors T2/T4 or T2/T3 for each H bridge branch circuit is selected to be lower than 1. In order to achieve an optimum system sensitivity, it is important that the dimensioning ratios of the transistors T2/T4, T2/T3 from the two circuit branches are equal. As, respectively, the H bridge circuit branch transistor applied to ground potential T1, T2, can only accept the current flowing in the oscillating circuit up to the value IS2–ΔI2, the respective transistor T1, T2 will change its operating mode from a low ohmic switch to a high ohmic power source. The resulting voltage amplitude V1, V2 is fed as an input signal into the AM demodulator AM. Preferably, the maximum current accepted by the transistors T1, T2 will be in the range between 95% and 99% of the current flowing through the transistors T3, T4. In order to be able to adjust the dimensioning ratio with precision, it may be advantageous to set up the transistors T1, T2 from several transistors connected in parallel.

Figure 4:
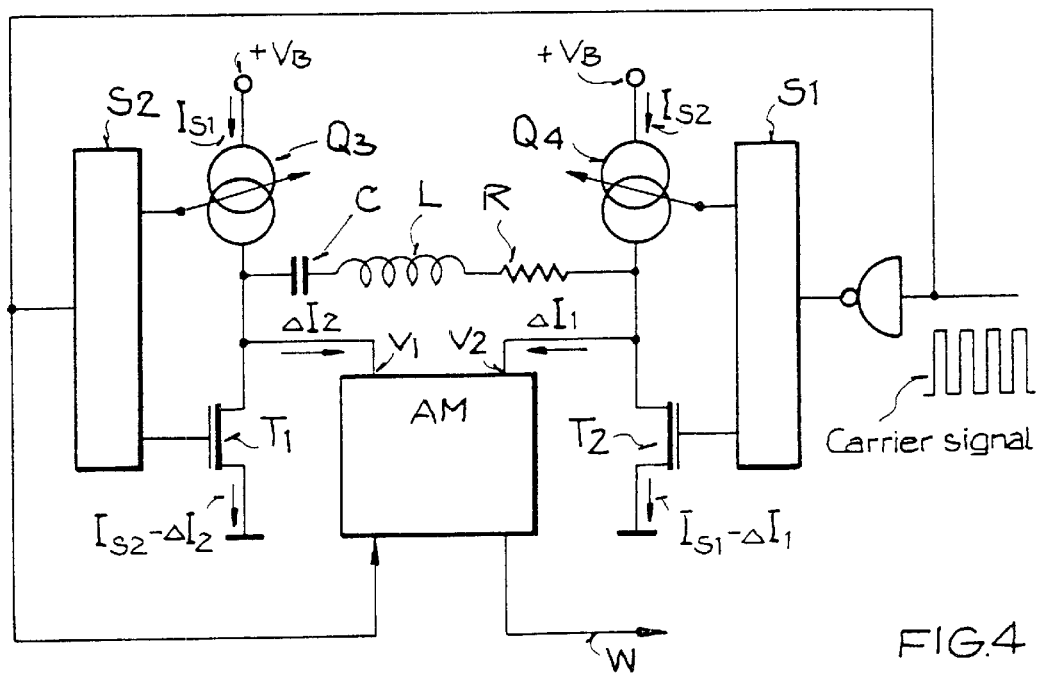

FIG. 4 shows a further advantageous embodiment of the circuit layout according to the invention. Here, the transistors T3, T4, which are applied to the supply voltage, have been implemented by means of controllable current sources Q3, Q4. This allows any production deviations in the dimensioning of the transistors T1, T2 to be compensated. At the same time, the symmetry, that is, the equality of currents Is1=Is2 between both H bridge circuit branches T2/T4, T2/T3 can be adjusted easily by post-adjusting the various current sources Q3, Q4.

In the various embodiments of the circuit layout according to the invention, it is possible to use—in the case of MOS transistors—P as well as N channel transistors, and, in the case of bipolar transistors, PNP as well as NPN transistors, without such proceeding creating a new circuit layout not covered by the invention.

What is claimed is:

1. Circuit layout for the contactless data transmission between a transponder and a base unit to acquire a low frequency signal which was modulated onto a carrier signal by means of AM modulation, comprising a serial oscillating circuit (L, C, R), which is excited by transistors (T1–T4), connected in the form of two circuit branches (T2, T3, and T1, T4) as an H bridge, with the two circuit branches (T2, T3, and T1, T4) of the H bridge being respectively driven by a control circuit each (S1, S2), and the H bridge being connected to a voltage supply source (VB), and, respectively, one resistor each (R1, R2) being connected in series with a circuit branch (T2, T3, and T1, T4) of the H bridge, wherein the first control circuit (S2) for the first H bridge circuit branch (T2, T3) is pulsed with the carrier signal, the second control circuit (S1) for the second H bridge circuit branch (T1, T4) is pulsed with the inverted carrier signal, at least one controllable current source (Q1, Q2) is connected in parallel to at least one resistor (R1, R2), and the resistor (R1, R2) is connected to the AM demodulator (AM) which is itself pulsed with the carrier signal.

2. Circuit layout in accordance with claim 1, wherein at least one of the controllable current sources (Q1, Q2) is replaced by a transistor (T5, T6).

3. Circuit layout in accordance with claim 1 wherein at least one of the transistors (T1, T2) connected to the ground potential is replaced by several transistors connected in parallel to one another.

4. Circuit layout in accordance with claim 1, wherein in the case of a positive supply voltage (VB) at least one of the H bridge transistors (T1, T2) connected to this supply voltage is a PNP or P channel transistor.

5. Circuit layout for the contactless data transmission between a transponder and a base unit to acquire a low frequency signal which was modulated onto a carrier signal by means of AM modulation, comprising a serial oscillating circuit (L, C, R), which is excited by transistors (T1–T4), connected in the form of two circuit branches (T2, T3, and T1, T4) as a H bridge, with the two circuit branches (T2, T3, and T1, T4) of the H bridge being respectively driven by a control circuit each (S1, S2), and the H bridge being connected to a voltage supply source (VB), and wherein the first control circuit (S2) for the first H bridge circuit branch (T2, T3) is pulsed with the carrier signal, the second control circuit (S1) for the second H bridge circuit branch (T1, T4) is pulsed with the inverted carrier signal, and at least one of the terminals (A1, A2) of the serial oscillating circuit is connected to the AM demodulator (AM), which is itself pulsed with the carrier signal.

6. Circuit layout in accordance with claim 5, wherein at least one of the transistors (T1, T2) connected to the ground potential is replaced by several transistors that are connected in parallel to one another.

7. Circuit layout in accordance with claim 5, wherein at least one of the H bridge transistors (T3, T4) is replaced by a controllable current source (Q3 or Q4).

8. Circuit layout in accordance with claim 5, wherein, in the case of a positive supply voltage (VB), at least one of the H bridge transistors (T1, T2) connected to this supply voltage is a PNP or P channel transistor.

* * * * *

UNITED STATES PATENT AND TRADEMARK OFFICE
CERTIFICATE OF CORRECTION

PATENT NO.    : 6,366,164 B1
DATED         : April 2, 2002
INVENTOR(S)   : Hanselmann Page 1 of 1

It is certified that error appears in the above-identified patent and that said Letters Patent is hereby corrected as shown below:

<u>Title page,</u>
Insert Item -- [30] Foreign Application Priority Data
            January 21, 2000    (DE)    100 02 501.3 --.

Signed and Sealed this

Fourth Day of April, 2006

JON W. DUDAS
*Director of the United States Patent and Trademark Office*